United States Patent
Lee et al.

(10) Patent No.: US 7,238,771 B2
(45) Date of Patent: Jul. 3, 2007

(54) DIBENZODIAZOCINE POLYMERS

(75) Inventors: Virgil J. Lee, Upland, CA (US); Li-Sheng Wang, Arcadia, CA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 0 days.

(21) Appl. No.: 11/112,119

(22) Filed: Apr. 22, 2005

(65) Prior Publication Data

US 2006/0058499 A1    Mar. 16, 2006

Related U.S. Application Data

(60) Provisional application No. 60/564,809, filed on Apr. 22, 2004.

(51) Int. Cl.
*C08G 73/06* (2006.01)

(52) U.S. Cl. ............... 528/424; 528/423; 528/397; 528/486; 528/487; 528/488; 528/503; 525/540; 544/245

(58) Field of Classification Search ............... 528/424, 528/423, 397, 486, 487, 488, 503; 525/540; 544/245

See application file for complete search history.

(56) References Cited

U.S. PATENT DOCUMENTS 4,447,607 A * 5/1984 Johnson ............... 540/471

OTHER PUBLICATIONS

Baughman, R. H., "Conducting Polymer Artificial Muscles," *Synthetic Metals*, 1996, pp. 339-353, vol. 78, Elsevier Science S.A.

Marsella, Michael, J., "Classic Annulenes, Nonclassical Applications," *Accounts of Chemical Research*, 2002, pp. 944-951, vol. 35, No. 11, American Chemical Society.

Paquette, Leo A., "Cyclooctatetraenes: Conformational and π-Electronic Dynamics within Polyolefinic [8]Annulene Frameworks," *Advances in Theoretically Interesting Molecules*, 1992, vol. 2, pp. 1-77, JAI Press Inc.

* cited by examiner

*Primary Examiner*—Duc Truong
(74) *Attorney, Agent, or Firm*—Christie, Parker & Hale, LLP

(57) ABSTRACT

Dibenzodiazocine polymers, methods for producing dibenzodiazocine polymers, products formed from dibenzodiazocine polymers, and uses for such dibenzodiazocine polymers are provided.

91 Claims, 1 Drawing Sheet

DIBENZODIAZOCINE POLYMERS

CROSS-REFERENCE TO RELATED APPLICATION(S)

This is an ordinary application of U.S. Provisional Application Ser. No. 60/564,809, filed on Apr. 22, 2004, the content of which is expressly incorporated herein by reference as if set forth in full herein.

FIELD OF THE INVENTION

This invention relates to the composition, preparation and applications of dibenzodiazocine polymers.

BACKGROUND OF THE INVENTION

Organic materials that can be induced to undergo a shape change have recently attracted a great deal of interest in mechanical actuator applications. These materials convert chemical, electrical, or electromagnetic energy into mechanical work. Electromechanical actuators are of particular interest as synthetic muscle materials. While a few clever approaches and materials have been proposed for emulating the action of muscles, this research area is still in its infancy and synthetic muscles remain an unattained goal of material scientists.

Electromechanical actuators based on redox-active polymers have been the most extensively studied systems for mimicking the action of muscles. The actuation mechanism in these materials is based on bulk volume changes that result from the uptake and expulsion of counterions during the redox cycle as shown in FIG. 1. Since the counterions in these systems have specific volumes, their introduction and removal from a bulk polymer result in the respective increase and decrease of the overall volume of the material. Unfortunately, slow cycle times and limited cycle lifetimes have prohibited the use of redox-active polymers as synthetic muscles. These limitations have fueled the search for new materials that are capable of electromechanical actuation via different mechanisms.

One of the more interesting approaches for achieving electromechanical actuation is based on [8]annulenes, which are eight-membered macrocycles with alternating single- and-double carbon bonds. These systems have tub-like structures in their neutral state that can undergo redox-induced tub-to-planar conformational changes. For example, the parent [8]annulene, cyclooctatetraene, undergoes a reversible conformation change from a contracted structure to a planar structure upon two-electron reduction described in Scheme 1 below. This conformation change also results in an increase SCHEME 1. The conformational change of cyclooctatetraene upon 2-electron reduction.

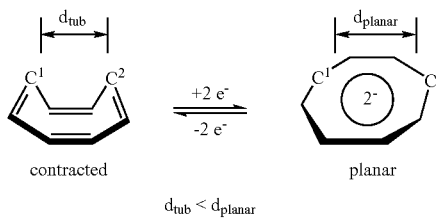

$d_{tub} < d_{planar}$ in distance between nonadjacent carbon atoms (e.g., $d_{planar}$ and $d_{tub}$ Scheme 1) that can be used to mimic the expansion and contraction of muscle tissue.

A useful way of harnessing the tub-to-planar geometry change of [8]annulenes in electomechanical actuators is to incorporate such ring systems into polymer structures, since polymers allow for facile processing into useful shapes. However, for such polymer materials to be useful in these applications they must also exhibit stable and reversible redox chemistry and be conjugated to facilitate long-range redox communication between repeat units. It is also highly desirable that their synthesis be facile and allow for structural variation so that the properties of the materials can be tailored to the needs of specific applications.

It turns out that these requirements place severe limitations on the use of polymers containing [8]annulene units in electromechanical actuation. For example, conjugated polymers incorporating cyclooctatetraene units are not useful in these applications because they are exceedingly difficult to prepare and can only be reduced under inert atmospheric conditions. While the redox stability of conjugated polymers containing [8]annulenes are dramatically improved by fusing six-membered rings to the cyclooctatetraene units such as in 1, 2,5,6-dibenzocyclooctatetraene 1 and tetra benzocyclooctatetraene 2, conjugated polymers incorporating these units have not been reported (presumably because they are also difficult to prepare). Additionally, the steric hindrance of the adjacent phenyl rings in 2 prevents its tub-to-planar conformation change. These restrictions have severely limited the ability to prepare useful polymer materials for electromechanical actuation based on the redox-induced conformational change of [8]annulene units.

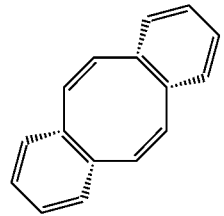

1

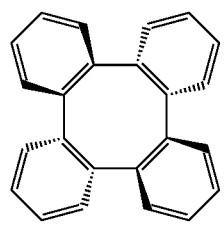

2

SUMMARY OF THE INVENTION

In one aspect, the present invention is directed to a polymer comprising repeat units selected from the group consisting of:

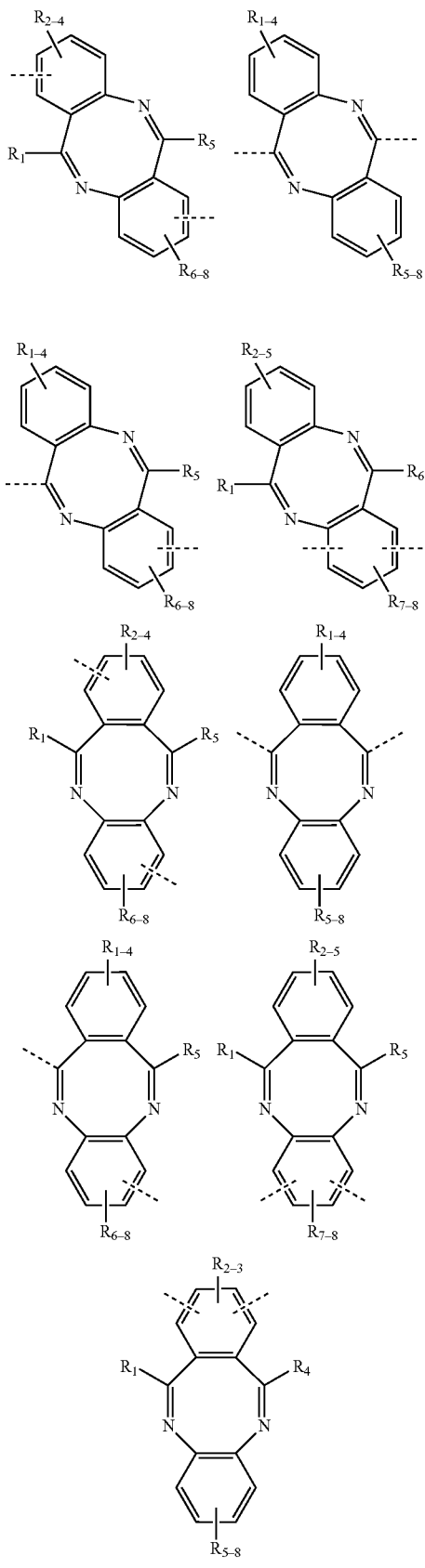

where $R_1$–$R_8$ are independently selected from the group consisting of H, alkyl, substituted alkyl, aryl, substituted aryl, heteroaryl, substituted heteroaryl, halogen, —CN, —CHO, —COR$_a$, —CR$_a$=NR$_b$, —OR$_a$, —SR$_a$, —SO$_2$R$_a$, —POR$_a$R$_b$, —PO$_3$R$_a$, —OCOR$_a$, —CO$_2$R$_a$, —NR$_a$R$_b$, —N=CR$_a$R$_b$, —NR$_a$COR$_b$, —CONR$_a$R$_b$ in which R$_a$ and R$_b$ are independently selected from the group consisting of H, alkyl, substituted alkyl, aryl, substituted aryl, heteroaryl, and substituted heteroaryl and two or more of $R_1$–$R_8$, R$_a$, and R$_b$ may or may not be linked to form a ring structure.

DETAILED DESCRIPTION OF THE INVENTION

Figure 1:
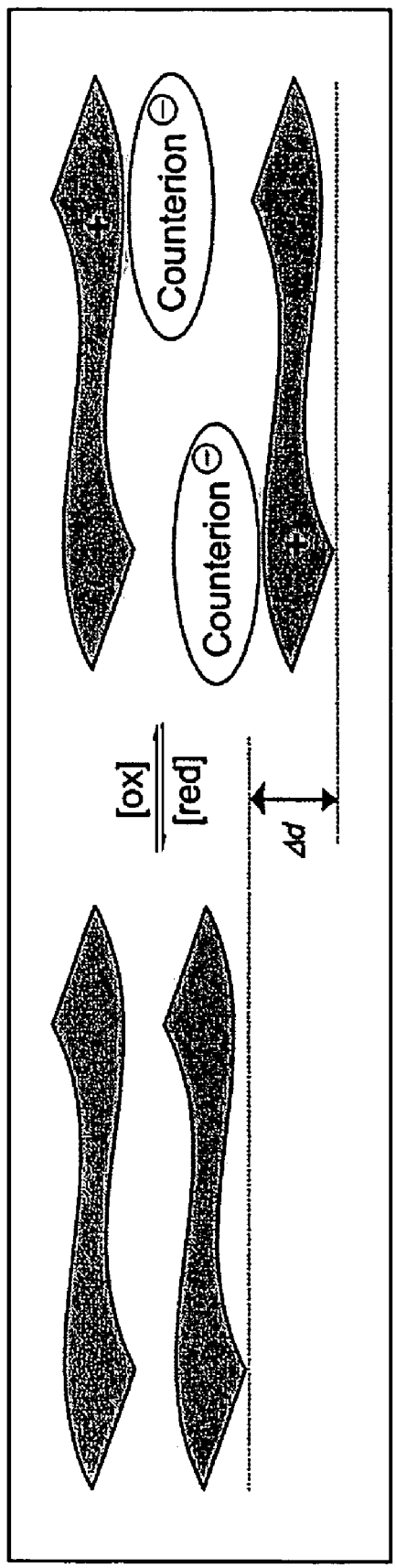
FIG. 1 is a conceptual illustration of the mechanism of electromechanical actuation in a redox-active polymer in which two individual polymer chains (ribbons) undergo a reversible displacement (Δd) on the intercalation of the counter ions (ovals) upon oxidation.

This invention deals with the composition, preparation, and applications of dibenzodiazocine polymers. In one embodiment the dibenzodiazocine polymers provided in accordance with practice of the present invention comprise either or both of the following repeat units:

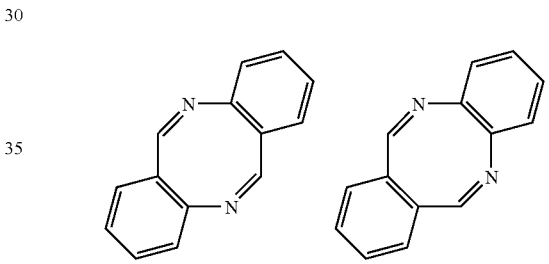

The dibenzodiazocine repeat units are diazo derivatives of [8]annulenes, and are therefore expected to be promising in electromechanical actuation applications. Set forth below are a number of polymer architectures and synthetic methodologies for the preparation of dibenzodiazocine-containing polymers. Additionally, several applications of these materials are described.

The polymers provided in accordance with the present invention are useful for high temperature applications. Polymers that are used in high temperature applications generally have maximum use temperatures of 200–250° C. While there are very few materials that tolerate maximum use temperature in excess of 250° C., their cost and/or their difficult processing protocols generally limit their widespread application. Derivatives of the dibenzodiazocine polymers provided in accordance with the present invention have exceedingly high glass transition temperatures ($T_g$s), which is a rough indicator of the use temperature for amorphous polymers. For example, 3, 4, and 5 are amorphous polymers comprising n number of repeat or recurring units and having glass transition temperatures of 269° C., 310° C., and 329° C., respectively (as measured by differential scanning calorimetry, DSC). Moreover, these materials readily succumb to melt processing (see Examples, below).

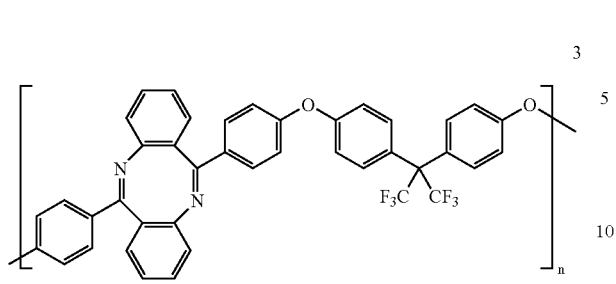

Tg = 269° C.

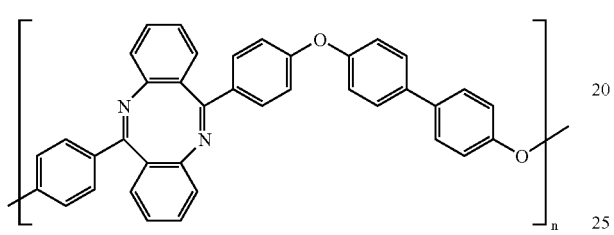

Tg = 310° C.

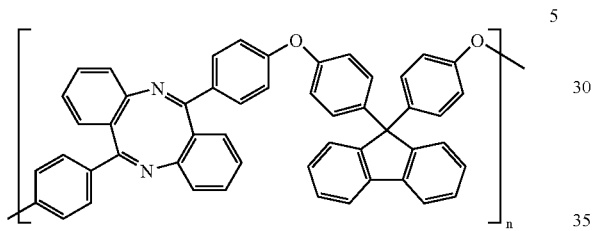

Tg = 329° C.

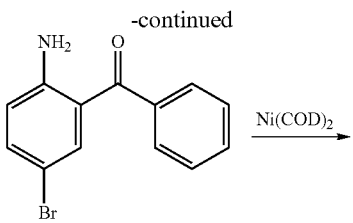

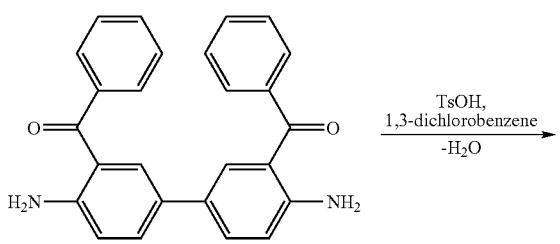

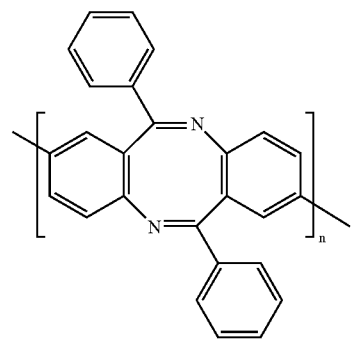

EXAMPLES

Example 1

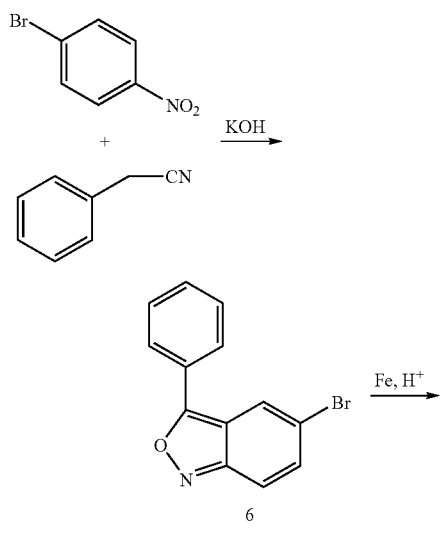

Preparation of 6: To a mechanically stirred solution of potassium hydroxide (148 g, 2.64 mol), phenylacetonitrile (16.7 mL, 0.126 mol mol), and methanol (300 mL) at 0° C. was added a solution of 4-bromonitrobenzene (25.4 g, 0.126 mol) in a 1:2 tetrahydrofuran:methanol solution (300 mL). The mixture was stirred for 4.5 h at 0° C. and then poured into water (1 L). The resulting precipitate was collected by filtration, and the product was purified by recrystallization from methanol. Yield 20.5 g (59.4%).

Preparation of 5-Bromo-2-aminobenzophenone: To a solution of 6 (27.4 g, 0.10 mol) in acetic acid (200 mL) at 80° C. was added water (50 mL) and iron powder (28 g, 0.5 mol) in ten portions over a two-hour period under nitrogen. The resulting mixture was stirred at 80° C. for an additional hour. The solution was cooled to room temperature and diluted with ether (1 L) and extracted with water (1 L). The organic layer was separated, dried, and condensed, and the product was recrystallized from methanol. Yield 22.38 g (81%).

Preparation of 3,3'Dibenzoylbenzidine (7): To a slurry of bis(1,5-cyclooctadiene)nickel(0) (22.5 g, 81.5 mmol) in dry dimethylformamide (200 mL) was added 5-bromo-2-aminobenzophenone (15 g, 54 mmol) in dry dimethylformamide (150 mL) under nitrogen. The slurry was stirred for 15 min at room temperature, stirred for 90 min at 42° C., and then poured in a 2% aqueous hydrochloric acid solution (500 mL). The solution was extracted with methylene chloride and the organic layer was filtered, dried, and condensed. The product was purified by chromatography. Yield 5.0 g (50%).

Preparation of 8: A 100 mL, round-bottomed flask fitted with a stirring bar and a Dean-Stark trap attached to a condenser was charged with 7 (1.96 g, 5 mmol), toluene sulfonic acid monohydrate (0.19 g, 1 mmol), and 1,3-dichlorobenzene (20 mL). The mixture was heated at reflux for 2 h. The mixture was then cooled to room temperature, neutralized with triethylamine (0.5 mL), and the product was coagulated in methanol (75 mL) and dried in vacuo. Yield 0.77 g, molecular weight was 12,000 by GPC (relative to polystyrene standards).

Example 2

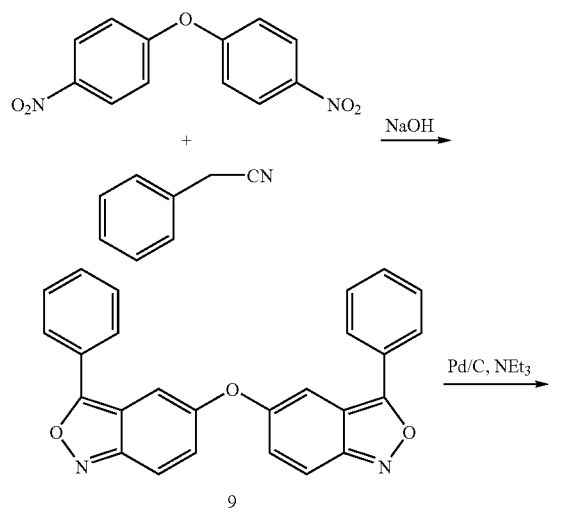

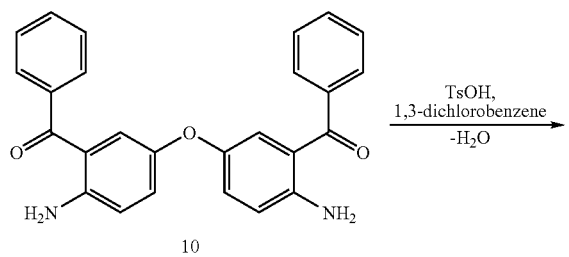

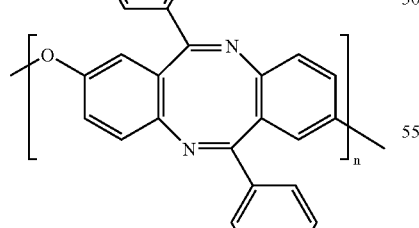

Preparation of 9: To a mechanically stirred solution of sodium hydroxide (100 g, 2.5 mole) in methanol (500 mL) was added phenylacetonitrile (64.4 g, 0.55 mol) at room temperature. The mixture was stirred for 5 min and then 4,4'-dinitrodiphenyl ether (65.1 g, 0.25 mol) was added. The solution was heated at 70° C. for 9 h and was then cooled to room temperature. The mixture was diluted with 50% aqueous methanol (250 mL) and cooled to approximately 0° C. The resulting precipitate was collected by filtration and purified by Soxhlet extraction with methanol. The product was dried in vacuo to give the product. Yield 38.4 g (38%).

Preparation of 4,4'-Diamino-3,3'-dibenzoyldiphenyl ether (10): A suspension of 9 (40.4 g, 0.10 mol) and 10% palladium on charcoal (2.12 g) in dry tetrahydrofuran (400 mL) was stirred under nitrogen at room temperature for 7.5 h. The reaction mixture was then filtered through Celite and the mother liquor was condensed. The resulting oil was mixed with methanol to afford the crystalline product, which was dried in vacuo. Yield 31.0 g (76%).

Preparation of 11: A 50 mL, round-bottomed flask fitted with a stirring bar and a Dean-Stark trap attached to a condenser was charged with 10 (2.04 g, 5.0 mmol), p-toluenesulfonic acid monohydrate (190 mg, 1 mmol), and 1,3-dichlorobenzene (20 mL). The mixture was heated at reflux for 22 h during which additional solvent was added to keep the reaction volume at 20–30 mL. The reaction was cooled to room temperature and poured into methanol (125 mL) to give a greenish-gray precipitate. The solid was collected by filtration, dried, and dissolved in dichloromethane (50 mL). The resulting solution was washed with 1 M aqueous sodium hydroxide (2×10 mL) and water (10 mL). The organic layer was separated, concentrated, and poured into methanol to give the light gray solid, which was collected by filtration. The solid was dried in vacuo at 80° C. (16 h). Yield 1.36 g; bimodal molecular weight peaks at 5,000,000 and 29,000 by GPC (relative to polystyrene standards).

Example 3

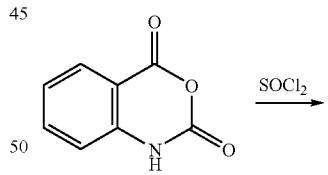

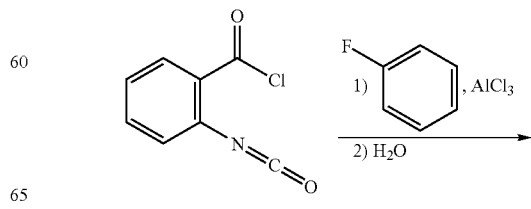

-continued

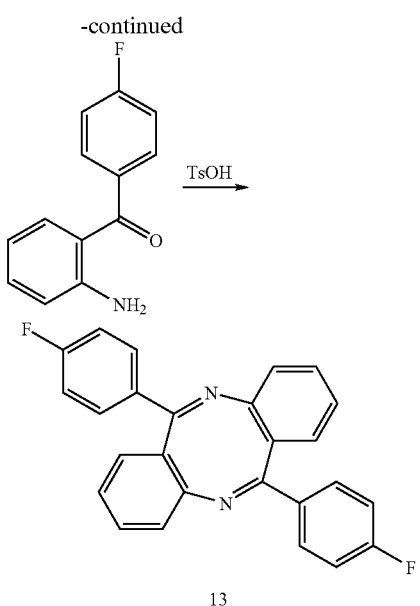

Preparation of 12: A 22 L round-bottomed flask was charged with isatoic anhydride (2.0 kg, 12.3 mol), thionyl chloride (14.7 kg, 123 mol), and pyridine (5 mL), and the mixture was stirred under nitrogen for 8 days. The excess thionyl chloride was removed under vacuum and the product was distilled from the reaction flask. Yield 1.98 kg (89%).

Preparation of 2-amino-4'-fluorobenzophenone: A 12 L round-bottomed flask was charged with aluminum trichloride (2.79 kg, 20.9 mol) and fluorobenzene (3.0 kg, 31 mol) and the resulting solution was cooled to −5° C. under nitrogen. A solution of 12 (1.52 kg, 8.4 mol) in fluorobenzene (1.0 kg, 10 mol) was slowly added, and the mixture was allowed to stir for an additional hour, before being poured over 10 kg of ice. The resulting solid was collected by filtration and dissolved in methylene chloride (6 L). The solution was filtered and the mother liquor was dried over magnesium sulfate and filtered through silica gel. The mother liquor was condensed to give the product, which was purified by chromatography. Yield 630 g (35%).

Preparation of 13: A 100 mL round-bottomed flask fitted with a Dean-Stark condenser was charged with 2-amino-4'-fluorobenzophenone (40 g, 0.19 mol), toluene sulfonic acid monohydrate (1.8 g, 0.01 mol), and xylene (40 mL). The mixture was heated at reflux for 16 h, before being cooled to room temperature. The resulting solid was purified by recrystallization from methylene chloride/hexane to give the product, which was dried in vacuo. Yield 32.75 g (89%).

Example 4

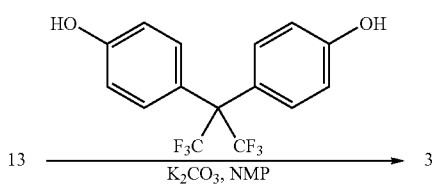

Preparation of 3: A 125 mL, round-bottomed flask fitted with a stirring bar and a Dean-Stark trap attached to a condenser was charged with bis-phenol-$A_f$ (4.267 g, 12.7 mmol), potassium carbonate (2.629, 19.1 mmol), N-methylpyrrolidinone (48 mL), and toluene (29 mL). The system was purged with nitrogen (0.5 h) and heated to reflux (16 h). A solution of 13 (5.0 g, 12.7 mmol) in toluene (29 mL) was added to the reaction mixture and 20–30 mL of toluene was removed by distillation. The resulting solution was heated at approximately 160° C. for 24 h. The reaction mixture was then diluted with N-methylpyrrolidinone (50 mL), cooled to room temperature, and poured into methanol (300 mL). The resulting gray solid was collected by filtration and dried in vacuo for 16 h. Dissolution in N-methylpyrrolidinone (100 mL) and filtration (1.2μ) was used to further purify the polymer. The filtrate was poured into methanol (600 mL), and the resulting solid was collected by filtration and washed with fresh methanol (100 mL). The solid was suspended in boiling methanol (300 mL, 2 h) before being collected by filtration and dried in vacuo at 65° C. for 6 h and then 165° C. for 16 h. Yield 7.16 g (82%); bimodal molecular weight peaks at 1,400,000 and 66,000 by GPC (relative to polystyrene standards).

Example 5

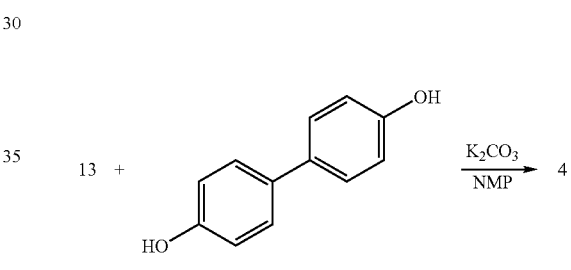

Preparation of 4: A 125 mL, round-bottomed flask fitted with a stirring bar and a Dean-Stark trap attached to a condenser was charged with biphenol (2.362 g, 12.7 mmol), potassium carbonate (2.629, 19.1 mmol), N-methylpyrrolidinone (48 mL), and toluene (29 mL). The system was purged with nitrogen (0.5 h) and heated to reflux (16 h). A solution of 13 (5.0 g, 12.7 mmol) in toluene (29 mL) was added to the reaction mixture and 20–30 mL of toluene was removed by distillation. The resulting solution was heated at approximately 160° C. for 10 h. The reaction mixture was then diluted with N-methylpyrrolidinone (100 mL), cooled to room temperature, and poured into methanol (600 mL). The resulting gray solid was collected by filtration and dried in vacuo for 16 h. Dissolution in N-methylpyrrolidinone (100 mL) and filtration (1.2μ) was used to further purify the polymer. The filtrate was poured into methanol (600 mL), and the resulting solid was collected by filtration and washed with fresh methanol (100 mL). The solid was suspended in boiling methanol (300 mL, 2 h) before being collected by filtration and dried in vacuo (65° C. for 6 h, then 165° C. for 24 h). Yield 5.70 g (83%); molecular weight is 100,000 by GPC (relative to polystyrene standards).

Example 6

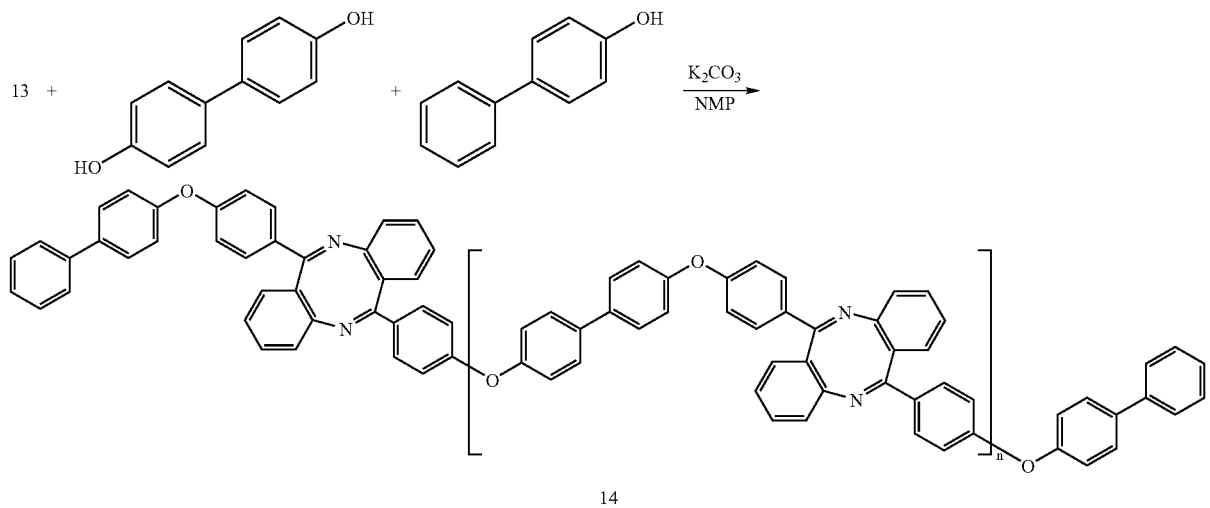

Preparation of 14: A 250 mL, round-bottomed flask fitted with a stirring bar and a Dean-Stark trap attached to a condenser is charged with biphenol (19.5 mmol), 4-hydroxybiphenyl (0.5 mmol), potassium carbonate (30 mmol), N-methylpyrrolidinone (75 mL), and toluene (45 mL). The system is purged with nitrogen (0.5 h) and heated to reflux for 16 h. A solution of 13 (5.0 g, 12.7 mmol) in toluene (25 mL) is added to the reaction mixture and 30–40 mL of toluene is removed by distillation. The resulting solution is heated at reflux for 10 h. The reaction mixture is then diluted with N-methylpyrrolidinone (150 mL), cooled to room temperature, and poured into methanol (1 L). The resulting solid is collected by filtration and dried in vacuo for 16 h. The solid is dissolved in N-methylpyrrolidinone (200 mL), filtered, and precipitated into methanol (600 mL). The solid is suspended in boiling methanol (400 mL, 2 h) and then filtered and dried in vacuo.

Example 7

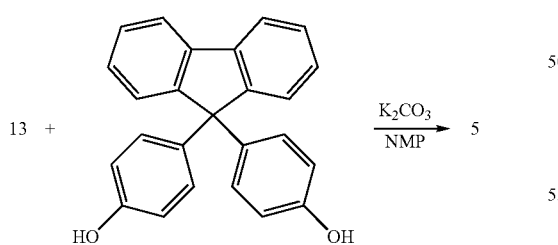

Preparation of 5: A 1 L, round-bottomed flask fitted with a stirring bar and a Dean-Stark trap attached to a condenser was charged with fluorene bisphenol (22.3 g, 63.5 mmol), potassium carbonate (13.1, 95.2 mmol), N-methylpyrrolidinone (257 mL), and toluene (128 mL). The system was purged with nitrogen (0.5 h) and heated to reflux for 16 h. The mixture was cooled slightly and 13 (25.0 g, 63.5 mmol) was added. The resulting solution was heated at reflux for 24 h. The reaction mixture was then diluted with N-methylpyrrolidinone (100 mL), cooled to room temperature, and poured into methanol (2 L). The resulting solid was dried in vacuo for 16 h. The polymer was dissolved in N-methylpyrrolidinone (900 mL), filtered (1.2μ), and the polymer was precipitated in water (3.6 L). The solid was collected and was suspended in boiling methanol (500 mL) before being collected by filtration and dried in vacuo (110° C. for 16 h. Yield 40.7 g (91%); molecular weight is 90,000 by GPC (relative to polystyrene standards).

Example 8

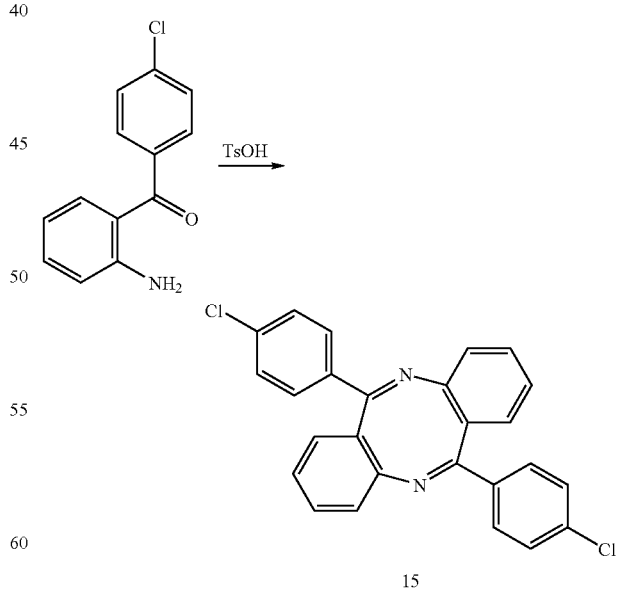

Preparation of 15: A 250 mL round-bottomed flask fitted with a Dean-Stark condenser was charged with 2-amino-4'-chlorobenzophenone (25 g, 0.11 mol), toluene sulfonic acid monohydrate (1.0 g, 0.005 mol), and xylene (90 mL). The mixture was heated at reflux for 16 h, before being cooled to room temperature. The resulting solid was purified by chromatography. Yield 18.5 g (80%).

Example 9

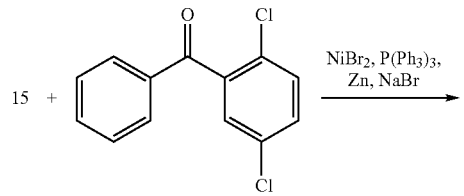

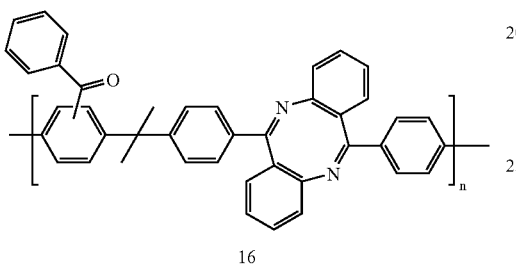

Preparation of 16: A 40 mL vial was charged with 15 (1.71 g, 4 mmol), 2,5-dichlorobenzophenone (1.0 g, 4 mmol), activated zinc powder (0.75 g, 12 mmol), nickel bromide (0.033 g, 0.15 mmol), triphenylphosphine (0.38 g, 0.15 mmol), sodium bromide (0.070 g, 0.68 mmol), and dry N-methylpyrrolidinone (10 mL) under nitrogen. The vial was sealed and the mixture was heated in an orbital shaker at 70° C. for 20 h. The mixture was then diluted with N-methylpyrrolidinone (20 mL) and filtered. The filtrate was poured into methanol (150 mL), and the resulting solid was collected by filtration. The solid was boiled in methanol (200 mL) and then dried in vacuo at 80° C. Yield 1.15 g (54%); molecular weight is 61,000 by GPC (relative to polystyrene standards).

Example 10

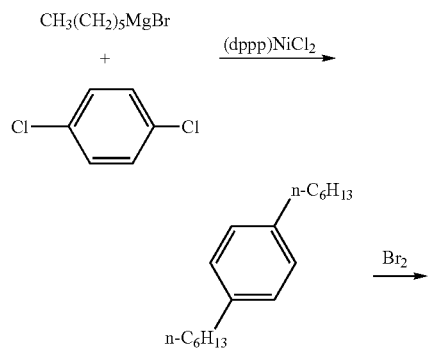

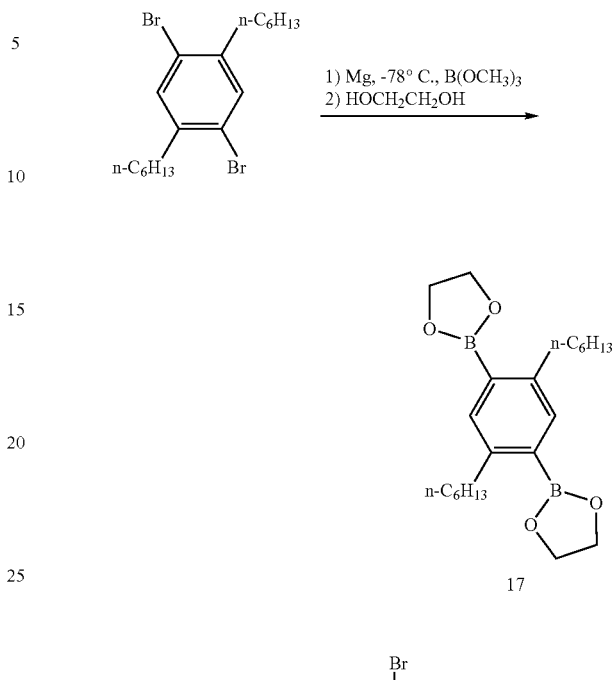

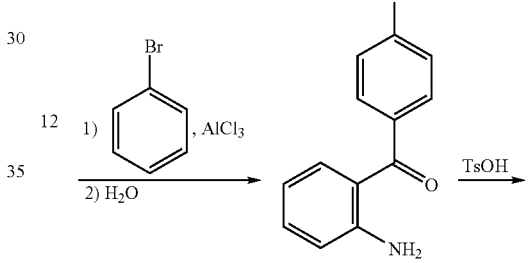

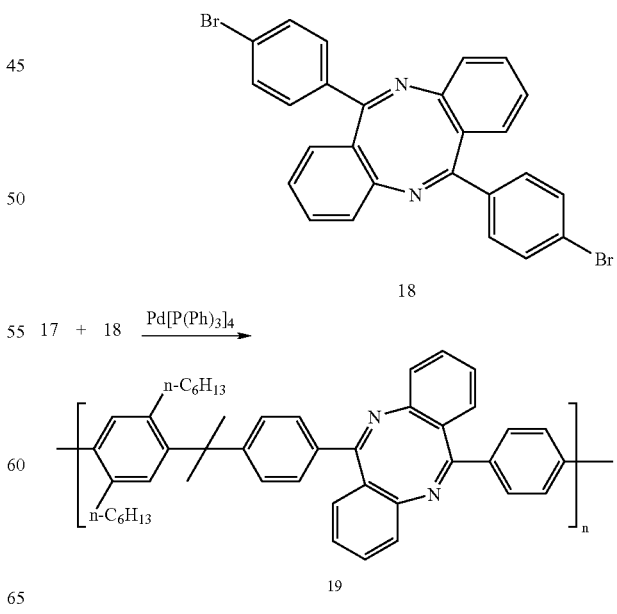

Preparation of 1,4-dihexylbenzene: A 2 L round-bottomed flask is charged with 1,4-dichlorobenzene (118 g, 0.80 mol), [1,3-bis(diphenylphosphino)propane]Ni(II) chloride (500 mg, 0.9 mmol), and dry ether (600 mL). The mixture is cooled to 0° C. and a 2 M solution of n-hexylmagnesium bromide in ether (1 L) is added dropwise. The cooling bath is removed, and the solution is slowly heated to reflux and allowed to boil for 24 h. The mixture is cooled to 0° C. and diluted with water (50 mL) and then with a 2 M aqueous hydrochloric acid solution (500 mL). The aqueous layer is separated, extracted with ether (2×200 mL), and the combined organic layers are washed with water (100 mL) and dried over magnesium sulfate. The solvent is removed in vacuo and the product is purified by distillation.

Preparation of 2,5-dibromo-1,4-dihexylbenzene: To a mixture of 1,4-dihexylbenzene (0.16 mol) and iodine (0.2 g, 1.6 mol) is added bromine (0.34 mol) dropwise in the dark. After 1 day at room temperature, a 20% aqueous potassium hydroxide solution (100 mL) is added, and the resulting mixture is shaken under slight warming until the color disappears. The mixture is then cooled to room temperature, the aqueous solution is decanted, and the product is crystallized from ethanol.

Preparation of 17: To a solution of 2,5-dibromo-1,4-dihexylbenzene (33 mmol) in tetrahydrofuran is added magnesium turnings (1.9 g, 80 mmol) under argon. The resulting Grignard reagent solution is slowly dropped into a stirred solution of trimethyl borate (38 mL, 330 mmol) in tetrahydrofuran at −78° C. for 2 h, and the resulting solution is warmed to room temperature and stirred for 2 days. The reaction mixture is poured over a 5% sulfuric acid/crushed ice solution while stirring, and the mixture is extracted with ether. The organic layer is separated and condensed, and the resulting solid is recrystallized from hexane-acetone. This solid is then stirred with 1,2-ethanediol (50 mmol) in toluene for 10 h, and the product is purified by chromatography.

Preparation of 2-amino-4'-bromobenzophenone: A 1 L round-bottomed flask is charged with aluminum trichloride (2.1 mol) and bromobenzene (3.1 mol) and the resulting solution is cooled to −5° C. under nitrogen. A solution of 12 (1.52 kg, 8.4 mol) in bromobenzene (1.0 kg, 10 mol) is slowly added and the mixture is allowed to stir for an additional hour, before being poured over 1 kg of ice. The resulting solid is collected by filtration and dissolved in methylene chloride (600 mL). The resulting solution is filtered and the mother liquor is dried over magnesium sulfate and filtered through silica gel. The mother liquor is condensed, and the product is purified by chromatography.

Preparation of 18: A 250 mL round-bottomed flask fitted with a Dean-Stark condenser is charged with 2-amino-4'-bromobenzophenone (0.11 mol), toluene sulfonic acid monohydrate (1.0 g, 0.005 mol), and xylene (90 mL). The mixture is heated at reflux for 16 h, before being cooled to room temperature. The resulting solid is purified by chromatography.

Preparation of 19: A 40 mL vial is charged with 17 (1.1 mmol), 18 (1.0 mmol), tetrakis(triphenylphosphine)palladium(0) (0.02 mmol), Aliquat (0.7 mL of a 60% solution), toluene (1.5 mL) under nitrogen. This solution is mixed with a 2 M aqueous potassium carbonate solution (1.6 mL), and the resulting solution is stirred under nitrogen for 16 h. The mixture is diluted with toluene (10 mL) and the organic layer is filtered. The solution is coagulated into a 9/1 methanol/water solution, and the resulting product is dried in vacuo.

Example 11

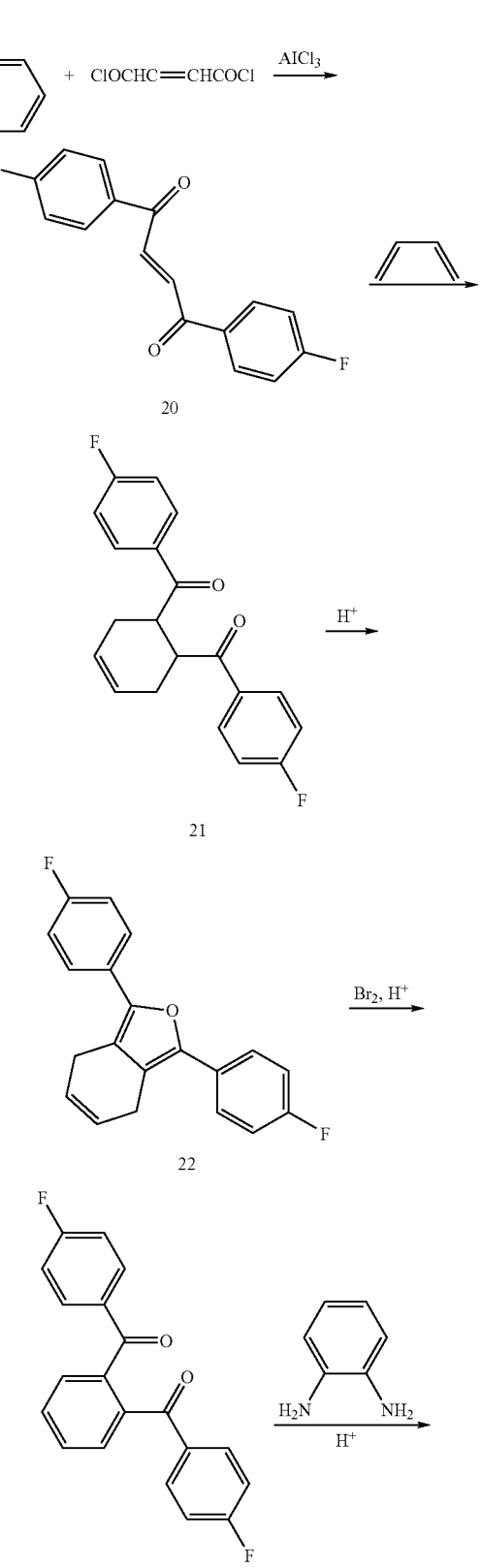

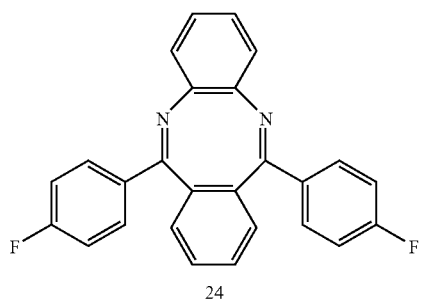

24

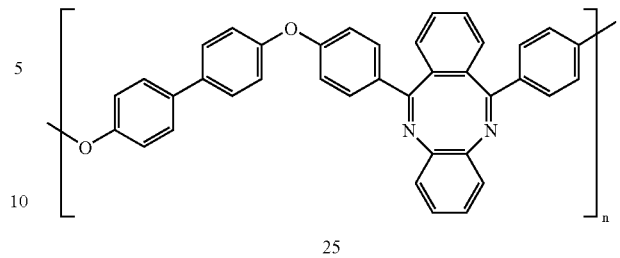

25

Preparation of 20: To a solution of fluorobenzene (50 g, 0.52 mol) and carbon disulfide (500 mL) is added aluminum trichloride (86.8 g, 0.651 mol). The resulting suspension is heated to reflux and fumaryl chloride (28.2 mL, 0.26 mol) is added over a 15-min period. The resulting solution is heated at reflux for 18 h and then cooled to room temperature and poured into an ice (1 kg)/concentrated hydrochloric acid (15 mL) mixture. The resulting solid is collected by filtration and recrystallized from toluene.

Preparation of 21: To a cooled solution of 1,3-butadiene (1.19 g, 22.1 mmol) in toluene (50 mL) is added 20 (3 g, 11 mmol). The mixture is heated at reflux in high pressure apparatus for 12 h. The solvent is removed under pressure, and the product is recrystallized from ethanol.

Preparation of 22: To a mixture of 21 (25 g) in hot acetic acid is added concentrated phosphoric acid (0.5 g). The mixture is heated at reflux for 10 min, cooled, and the resulting product is collected by filtration.

Preparation of 23: To a boiling solution of 22 (10.9 g, 35.4 mmol) in glacial acetic acid (500 mL) is added bromine (11.3 mL, 70.8 mmol) in glacial acetic acid (60 mL). The mixture is heated at reflux for 15 min, cooled, and sodium acetate (23.2 g, 283 mmol) is added. The resulting mixture is heated at reflux for an additional 15 min. The mixture is cooled, diluted with water (150 mL), and stirred at room temperature for several hours. The resulting white precipitate is collected by filtration and recrystallized from ethanol.

Preparation of 24: A 100 mL round-bottomed flask fitted with a Dean-Stark condenser is charged with 23 (0.2 mol), toluene sulfonic acid monohydrate (1.8 g, 0.01 mol), and mesitylene (40 mL). The mixture is heated at reflux for 16 h and then cooled to room temperature. The resulting solid is purified by chromatography.

Example 12

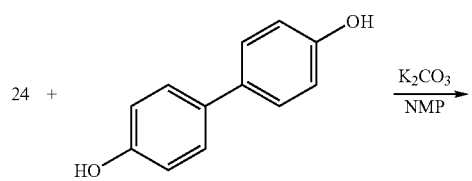

Preparation of 25: A 125 mL, round-bottomed flask fitted with a stirring bar and a Dean-Stark trap attached to a condenser is charged with biphenol (12.7 mmol), potassium carbonate (19.1 mmol), N-methylpyrrolidinone (48 mL), and toluene (29 mL). The system is purged with nitrogen (0.5 h) and heated to reflux (16 h). A solution of 24 (12.7 mmol) in toluene (20 mL) is added to the reaction mixture and 20–30 mL of toluene is removed by distillation. The resulting solution is heated at reflux for 10 h, diluted with N-methylpyrrolidinone (100 mL), cooled to room temperature, and poured into methanol (600 mL). The resulting solid is collected by filtration and dried in vacuo for 16 h. The solid is redissolved in N-methylpyrrolidinone (100 mL), filtered, precipitated in methanol (100 mL), and the resulting solid dried in vacuo.

Example 13

Solution Film Casting of 4: A solution of 4 (1.29 g) in N-methylpyrrolidinone (10 mL) was poured on a glass plate. The solvent was removed in vacuo (100° C., 16 h) to give a transparent, yellow film.

Example 14

Compression Molding of 3: A 40 mm×12 mm mold was charged with 3 (0.75 g). The mold was placed between the platens of a heated press (320° C.) with the application of 1,000 lbs. of force (0.5 h). The heating source was turned off, and the mold was allowed to cool slowly to approximately 50° C. The resulting compression molded panel was translucent brown in appearance.

Example 15

Compression Molding of 4: A 40 mm×12 mm mold was charged with 4 (0.75 g). The mold was placed between the platens of a heated press (360° C.) with the application of 1,000 lbs. of force (0.5 h). The heating source was turned off, and the mold was allowed to cool slowly to approximately 50° C. The resulting compression molded panel was dark brown in appearance.

Example 16

Preparation of Glass Fiber Composite of 4 by Compression Molding: A 10% solution of 4 in N-methylpyrrolidinone was poured onto a 3 inch×3 inch glass fabric (2 g) and the solvent was removed in vacuo. The fabric was cut into five equal pieces and the pieces were layered on top of one another in a compression mold. The mold was heated in a hot press at 350° C. at 5,000 psi for 30 min. The mold was then cooled to room temperature and the composite was removed.

Example 17

Preparation of Carbon Fiber Composite of 4 By Vacuum Bagging: A 10% solution of 4 in N-methylpyrrolidinone is poured onto a 3 inch×3 inch carbon fabric and the solvent is partially removed in vacuo. The fabric is draped over a mold that is covered with a release film and a bleeder layer, and the layered structure is placed in a vacuum bag. The vacuum bag set up is placed in an autoclave at 350° C. and 200 psi for 2 h and a vacuum of 740 torr is established, which is then cooled to room temperature to yield the final part.

Compositions containing 0.1% or more by weight of one or more polymers or copolymers provided in accordance with practice of the present invention and up to 99.9% by weight of other polymers or additives are contemplated.

Examples of additives that can be mixed or compounded with the dibenzodiazocine polymers provided in accordance with practice of the present invention include the following:

Light stabilizers (e.g., 2-hydroxybenzophenones, 2-hydroxyphenylbenzotriazoles, hindered amines, salicylates, cinnamate derivatives, resorcinol monobenzoates, oxanilides, p-hydroxybenzoates, etc.); plasticizers (e.g., phthalates, etc.); high-polymeric additives for improving impact strength; fillers (carbonates, glass fibers, aluminum hydroxide, kaolin, talc, silicon dioxide, wallastonite, glass spheres, mica, carbon fibers, and carbon whiskers, etc.); colorants; flame retardants (e.g., aluminum hydroxide, antimony oxides, boron compounds, bromine compounds, chlorine compounds, etc.); antistatic additives; biostabilizers; and blowing agents.

Additionally, it is envisioned that the dibenzodiazocine polymers may be blended with any other polymers including but not limited to polyetheretherketones, polyetherimides (e.g., Ultem™), polyamideimides (e.g., Torlon™), polyphenylenes (e.g., Parmax®), polysulfones (e.g., Udel™ and Radel™), polyimides, polyamides, polyesters, polycarbonates, polyureas, liquid crystalline polymers, polyolefins, styrenics, polyvinylchloride, phenolics, polyethylene terephathalates, and acrylics.

Devices such as radios, television sets and computers can employ electrical wiring coated with one or more polymers or copolymers of the present invention or can employ the polymer or copolymer of the present invention as a dielectric material. Furthermore the polymers or copolymers of the present invention can be used as dielectrics in various electronic applications including but not limited to printing wiring boards, semiconductors, and flexible circuitry. Additionally, dibenzodiazocene polymers and copolymers can be used in various electronic adhesive applications including but not limited to lead-frame adhesives.

The above descriptions of the exemplary embodiments of dibenzodiazocine polymers including their preparation and applications of use are for illustrative purposes. Because of variations which will be apparent to those skilled in the art, the present invention is not intended to be limited to the particular embodiments described above. The scope of the invention is defined in the following claims.

What is claimed is:

1. A polymer comprising one or more dibenzodiazocine units selected from the group consisting of:

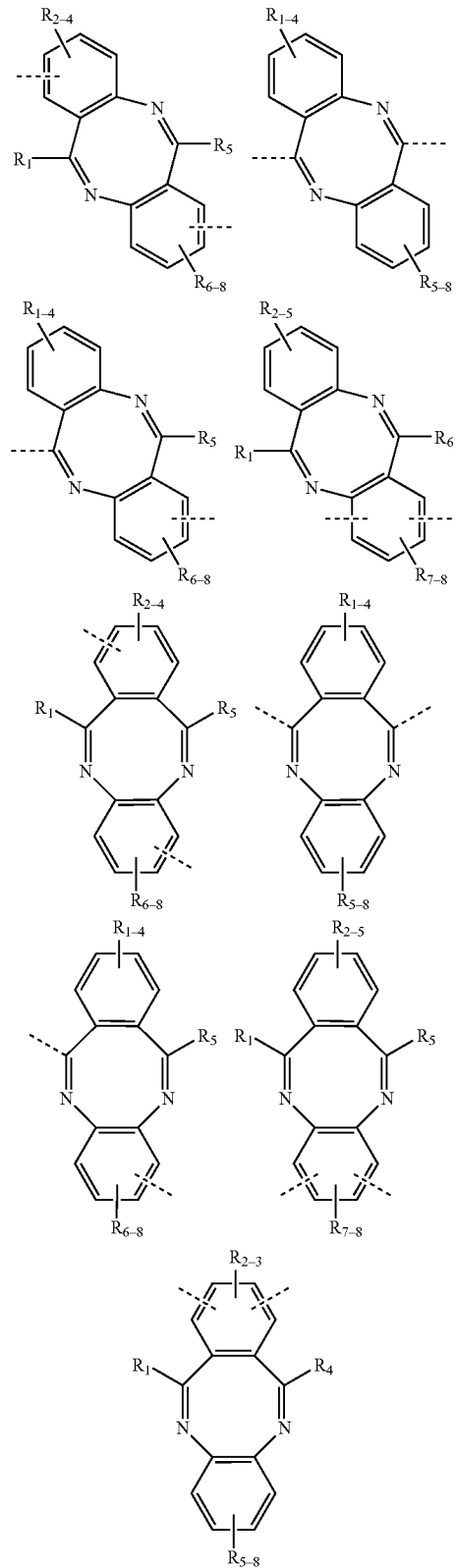

where $R_1$–$R_8$ are independently selected from the group consisting of H, alkyl, substituted alkyl, aryl, substituted aryl, heteroaryl, substituted heteroaryl, halogen, —CN, —CHO, —COR$_a$, —CR$_a$=NR$_b$, —OR$_a$, —SR$_a$, —SO$_2$R$_a$, —POR$_a$R$_b$, —PO$_3$R$_a$, —OCOR$_a$, —CO$_2$R$_a$, —NR$_a$R$_b$, —N=CR$_a$R$_b$, —NR$_a$COR$_b$, —CONR$_a$R$_b$ in which R$_a$ and R$_b$ are independently selected from the group consisting of H, alkyl, substituted alkyl, aryl, substituted aryl, heteroaryl, and substituted heteroaryl and two or more of R$_1$–R$_8$, R$_a$, and R$_b$ may or may not be linked to form a ring structure.

2. A co-polymer comprising the general structural formula:

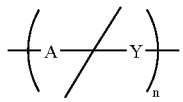

wherein n is the number of recurring units, -A- comprises at least 0.1% of the recurring units and wherein -A- is a dibenzodiazocine unit selected from the group consisting of:

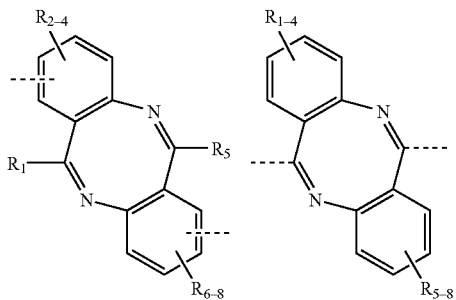

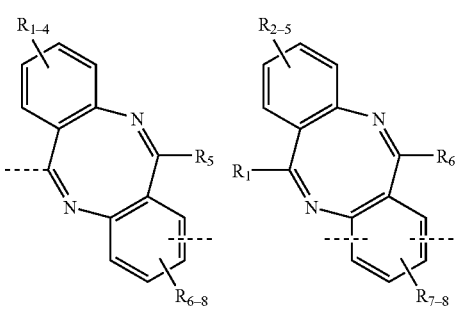

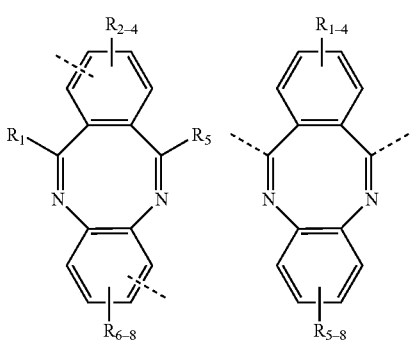

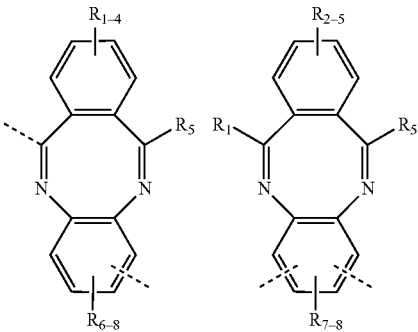

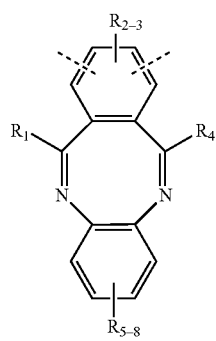

where R$_1$–R$_8$ are independently selected from the group consisting of H, alkyl, substituted alkyl, aryl, substituted aryl, heteroaryl, substituted heteroaryl, halogen, —CN, —CHO, COR$_a$, —CR$_a$=NR$_b$, —OR$_a$, —SR$_a$, —SO$_2$R$_a$, —POR$_a$R$_b$, —PO$_3$R$_a$, —OCOR$_a$, —CO$_2$R$_a$, —NR$_a$R$_b$, —N=CR$_a$R$_b$, —NR$_a$COR$_b$, —CONR$_a$R$_b$ in which R$_a$ and R$_b$ are independently chosen from the group consisting of H, alkyl, substituted alkyl, aryl, substituted aryl, heteroaryl, and substituted heteroaryl and two or more of R$_1$–R$_8$, R$_a$, and R$_b$ may or may not be linked to form a ring structure;

and where Y is one or more divalent groups selected from -Z-, -Z-Ar$_a$—, and —Ar$_a$-Z-Ar$_b$—, wherein Z is a divalent group chosen from the group consisting of —O—, —S—, —NR$_c$—, —O(CO)—, —O(CO$_2$)—, —(CO)NR$_c$(CO)—, —NR$_c$(CO)—, —OAr$_a$O—, phthalimide, pyromellitimide, —CO—, —SO—, —SO$_2$—, —P(O)R$_c$—, and —CR$_c$R$_d$—, in which R$_c$ and R$_d$ are independently chosen from the group consisting of H, alkyl, substituted alkyl, aryl, substituted aryl, heteroaryl, and substituted heteroaryl and may or may not be linked to form a ring structure and in which Ar$_a$ and Ar$_b$ are independently chosen from the group consisting divalent aromatic units including but not limited to phenylene, substituted phenylene, biphenyl, substituted biphenyl, terphenyl, substituted terphenyl, naphthyl, substituted naphthyl, fluorenyl, substituted fluorenyl, anthracenyl, and substituted anthracenyl.

3. The polymer or copolymer of claims 1 or 2 in which one or more of the benzo-carbon atoms of the dibenzodiazocine units are replaced with nitrogen.

4. The polymer or copolymer of claims 1 or 2 wherein the polymer is linear, branched hyperbranched, dendritic, random, block, or some combination thereof.

5. The polymer or copolymer of claims 1 or 2 in which one or more of the dibenzodiazocine repeat units are in their mono- or dicationic forms.

6. The polymer or copolymer of claims 1 or 2 in which one or more of the imine nitrogen atoms of the dibenzodiazocine repeat units in the polymer units are protonated.

7. The polymer or copolymer of claims 1 or 2 in which one or more of the imine nitrogen atoms of the dibenzodiazocine repeat units in the polymer are iminium salts.

8. The polymer or copolymer of claims 1 or 2 in which one or more of the dibenzodiazocine repeat units in the polymer are in their mono- or dianionic forms.

9. The polymer or copolymer of claims 1 or 2 in which the polymer has a weight average molecular weight of 5,000–10,000,000 as measured by gel permeation chromatography relative to polystyrene standards.

10. The polymer or copolymer of claims 1 or 2 in which the polymer contains crosslinkable functional groups.

11. The polymer or copolymer of claims 1 or 2 in which the polymers contains chemically reactive end groups.

12. A composition containing 0.1% or more by weight of one or more of the polymers or copolymers of claims 1 or 2 and up to 99.9% by weight of other polymers or additives.

13. The polymer or copolymer of claim 12 in which the additive improves the physical properties, processing characteristics, stability, or some combination thereof relative to the parent polymer.

14. The polymer or copolymer of claim 12 wherein the additive decreases the melt viscosity of the parent polymer.

15. The polymer or copolymer of claim 12 wherein the additive improves the photostability of the parent polymer.

16. The polymer or copolymer of claim 12 employing an additive that lowers the cost of the parent polymer.

17. The polymer or copolymer of claim 2 wherein the polymer backbone preferably contains greater than 50% alternating double and single bonds.

18. The polymer or copolymer of claim 2 wherein the polymer backbone contains greater than 75% alternating double and single bonds.

19. The polymer or copolymer of claim 2 wherein the polymer backbone contains alternating double and single bonds.

20. The polymer or copolymer of claims 1 or 2 in which one or more metals are either chelated, covalently bound, ionically bound, or some combination thereof to the polymer.

21. The polymer or copolymer of claim 20 in which the metal is independently chosen from the group consisting of transition metals.

22. The polymer or copolymer of claim 1 or 2 in which one or more of the substituents $R_1$–$R_8$ is independently chosen from the group consisting of —$SO_3H$, —$SO_3^{\ominus}$, —$PO_3H$ or —$PO_3^{\ominus}$.

23. The polymer or copolymer of consisting of mixtures of one or more of the polymers or copolymers of claims 1 or 2 and fibers.

24. The polymer or copolymer of claim 23 in which the fibers are independently selected from the group consisting of rayon, acrylic, pitch, aramids, polybenzimidazole, polybenzoxazole, polyphenylene sulfide, melamine, fluoropolymers, and high-density polyethylene, glass, and carbon.

25. A composition comprising the general structural formula:

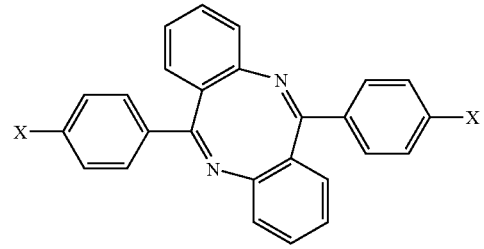

where X is selected from the group consisting of fluoro, chloro, bromo, iodo, and nitro.

26. A composition comprising the general structural formula:

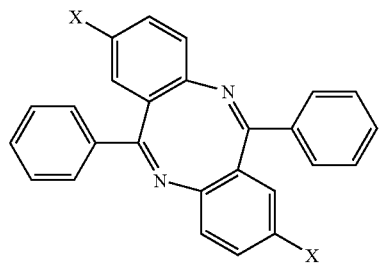

where X is selected from the group consisting of chloro, bromo, and iodo.

27. A composition comprising the general structural formula:

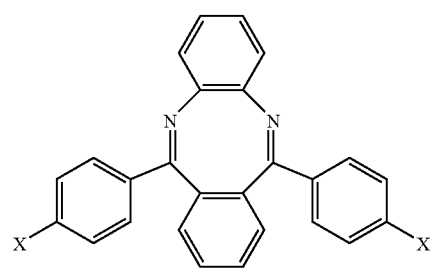

where X is selected from the group consisting of fluoro, chloro, bromo, iodo, and nitro.

28. A process for preparing the copolymers of claim 2 involving a nucleophilic displacement polymerization reaction between bis-phenols and aryl dihalides in the presence of base.

29. A process for preparing the copolymers of claim 2 involving a nucleophilic displacement polymerization reaction between one or more bis-phenoxide monomers and at least one monomer selected from the group consisting of:

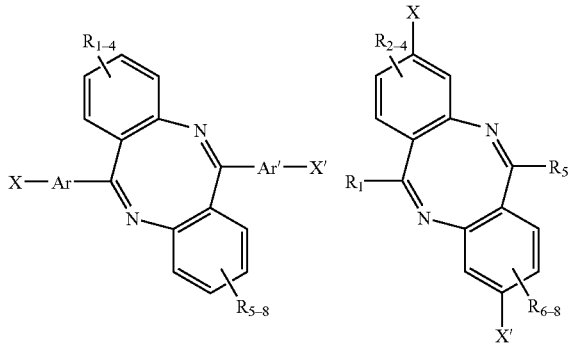

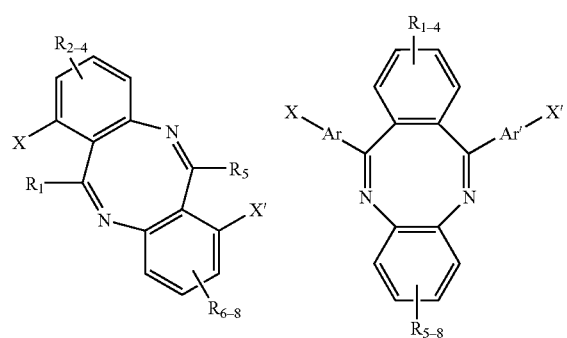

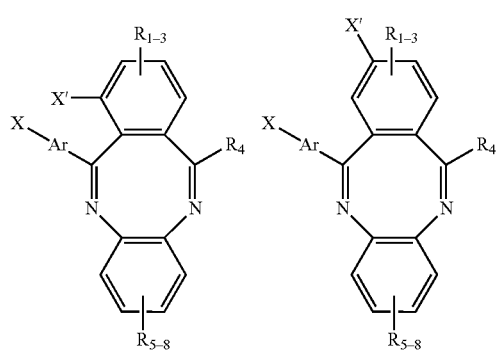

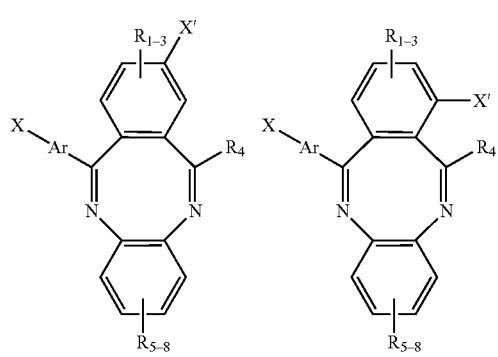

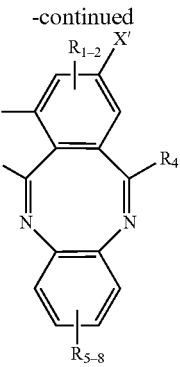

where Ar and Ar' are divalent aromatic units including but not limited to 1,2-phenylene, 1,4-phenylene, substituted 1,2-phenylene, substituted 1,4-phenylene, 4,4'-biphenylene, substituted 4,4'-biphenylene, 4,4"-terphenylene, substituted 4,4"-terphenylene, 1,4-naphthylene, substituted 1,4-naphthylene, 2,6-naphthylene, substituted 2,6-naphthylene, 2,7-fluorenylene, substituted 2,7-fluorenylene, 2,6-anthracenylene, substituted 2,6-anthracenylene; 9,10-anthracenylene, and substituted 9,10-anthracenylene;

where X and X' are independently selected from the group consisting of chloro, fluoro, and nitro;

and where $R_1$–$R_8$ are independently selected from the group consisting of H, alkyl, substituted alkyl, aryl, substituted aryl, heteroaryl, substituted heteroaryl, halogen, —CN, —CHO, $COR_a$, —$CR_a$=$NR_b$, —$OR_a$, —$SR_a$, —$SO_2R_a$, —$POR_aR_b$, —$PO_3R_a$, —$OCOR_a$, —$CO_2R_a$, —$NR_aR_b$, —N=$CR_aR_b$, —$NR_aCOR_b$, —$CONR_aR_b$ in which $R_a$ and $R_b$ are independently selected from the group consisting of H, alkyl, substituted alkyl, aryl, substituted aryl, heteroaryl, and substituted heteroaryl and two or more of $R_1$–$R_8$, $R_a$, and $R_b$ may or may not be linked to form a ring structure.

30. The process of claim 29 where X=X'.

31. The process of claim 29 where Ar and Ar' are the same and selected from the group consisting of 1,2-phenylene units and 1,4-phenylene units.

32. The process of claim 29 where the bis-phenoxide monomer or monomers are independently derived from the reaction of a base and at least one compound chosen from the group consisting of catechol; resorcinol; hydroquinone; 4,4'-biphenol; bisphenol-A; 4,4'-(hexafluoroisopropylidene)-diphenol; phenolphthalein; 1,2-dihydroxynaphthalene; 1,3-dihydroxynaphthalene; 1,5-dihydroxynaphthalene; 1,6-dihydroxynaphthalene; 2,3-dihydroxynaphthalene; 2,6-dihydroxynaphthalene; 2,7-dihydroxynaphthalene; and 4,4'-(9-fluorenylidene)diphenol.

33. The process of claim 29 where up to 10% of one or more mono-functionalized aryl halides or mono-functionalized phenoxides are added to the reaction to endcap the polymer.

34. A process for preparing the polymers or co-polymers of claims 1 or 2 involving the metal-catalyzed reductive coupling of either dihalogenated dibenzodiazocine derivatives or dihalogenated substituted dibenzodiazocine derivatives.

35. The process of claim 34 involving a nickel catalyst, phosphine or phosphite ligand, and a reducing metal.

36. The process of claim 34 where the dihalogenated dibenzodiazocine derivatives or dihalogenated substituted dibenzodiazocine derivatives are dichloro dibenzodiazocine derivatives or bis(chlorophenyl)dibenzodiazocine derivatives.

37. The process of claim 35 in which the reducing metal is independently selected from the group consisting of lithium, sodium, potassium, magnesium, calcium, and zinc.

38. The process of claim 34 where up to 10% of one or more mono-functionalized halides are added to the reaction to endcap the polymer.

39. A process for preparing the polymers or copolymers of claim 2 involving the metal-catalyzed coupling of metal-stabilized dicarbanionic moieties with either dihalogenated dibenzodiazocine derivatives or dihalogenated substituted dibenzodiazocine derivatives.

40. The process of claim 39 in which the stabilizing metal is independently chosen from the group consisting of Li, Na, Mg, K, Ca, Cu, Zn, Ag, Cd, Sn, Au, and Hg.

41. The process of claim 39 involving the palladium- or nickel-catalyzed reaction of either aromatic bis-boronic acids or aromatic bis-boronic esters with diiodo-, dibromo, or dichloro dibenzodiazocine derivatives in the presence of base.

42. The process of claim 39 where up to 10% of one or more mono-functionalized halides or mono-functionalized metal-stabilized carbanionic moieties are added to the reaction to endcap the polymer.

43. A process for preparing the polymers or copolymers of claims 1 or 2 involving either the acid-catalyzed self condensation of one or more monomers derived from the group consisting of

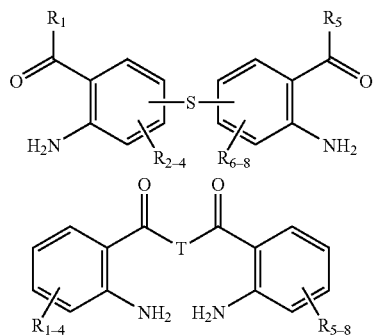

or the acid-catalyzed mixed condensation of one or more monomers derived from the group consisting of

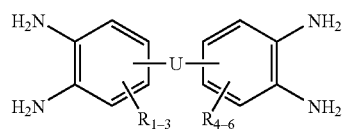

with one or more monomers derived from the group consisting of

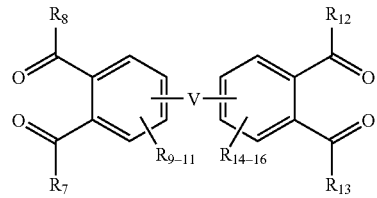

where $R_1$–$R_{16}$ are independently selected from the group consisting of H, alkyl, substituted alkyl, aryl, substituted aryl, heteroaryl, substituted heteroaryl, halogen, —CN, —CHO, COR$_a$, —CR$_a$=NR$_b$, —OR$_a$, —SR$_a$, —SO$_2$R$_a$, —POR$_a$R$_b$, —PO$_3$R$_a$, —OCOR$_a$, —CO$_2$R$_a$, —NR$_a$R$_b$, —N=CR$_a$R$_b$, —NR$_a$COR$_b$, —CONR$_a$R$_b$, in which R$_a$ and R$_b$ are independently selected from the group consisting of H, alkyl, substituted alkyl, aryl, substituted aryl, heteroaryl, and substituted heteroaryl and two or more of $R_1$–$R_{16}$, R$_a$, and R$_b$ may or may not be linked to form a ring structure;

and where S, U and V are independently selected from the group consisting of nil or one or more divalent groups independently selected from the group consisting of -Z-, -Z-Ar$_a$—, and —Ar$_a$-Z-Ar$_b$—, and T is selected from the group consisting of —Ar$_a$- and —Ar$_a$-Z-Ar$_b$— in which Z is a divalent group selected from the group consisting of —O—, —S—, —NR$_a$—, —O(CO)—, —O(CO$_2$)—, —(CO)N R$_a$(CO)—, —NR$_a$(CO)—, —OAr$_b$O—, phthalimide, pyromellitimide, —CO—, —SO—, —SO$_2$—, —P(O)R$_c$—, and —CR$_c$R$_d$— in which R$_c$ and R$_d$ are independently selected from the group consisting of H, alkyl, substituted alkyl, aryl, substituted aryl, heteroaryl, and substituted heteroaryl and may or may not be linked to form a ring structure and in which Ar$_a$ and Ar$_b$ are independently selected from the group consisting of divalent aromatic units including but not limited to phenylene, substituted phenylene, biphenyl, substituted biphenyl, terphenyl, substituted terphenyl, naphthyl, substituted naphthyl, fluorenyl, substituted fluorenyl, anthracenyl, and substituted anthracenyl.

44. The process of claim 43 where up to 10% of one or more of a mono-functionalized ortho-aminoketo aryl derivative; mono-functionalized ortho-aminoformyl aryl derivative; mono-functionalized 1,2-diaminoaryl derivative; mono-functionalized 2-diketo aryl derivative; mono-functionalized 1,2-diformyl aryl derivatives; or mono-functionalized 1-keto-2-formyl aryl derivative are added to the reaction to endcap the polymer.

45. A process wherein a polymer or copolymer of claim 20 serves as a catalyst for synthetic organic transformations.

46. A process for increasing the molecular weight of a polymer or copolymer of claim 10 involving heating the polymer at temperatures above 200° C.

47. A process for curing the polymer or copolymer of claim 11 involving a chemical reaction of the polymer to induce a crosslinking response.

48. A process for sulfonating a polymer or copolymer of claims 1 or 2 involving a reaction between the polymer and a sulfonating reagent.

49. A process for phosphorylating a polymer or copolymer of claims 1 or 2 involving heating the polymer with a phosphorylating reagent.

50. A process for oxidizing a polymer or copolymer of claims 1 or 2 involving either the reaction between the polymer and an oxidizing reagent or the electrochemical oxidation of the polymer.

51. A process for reducing a polymer or copolymer of claims 1 or 2 involving either the reaction between the polymer and a reducing reagent or the electrochemical reduction of the polymer.

52. A process for fabricating solid articles from a polymer or copolymer of claims 1 or 2 comprising compression molding said polymer.

53. A process for fabricating solid articles from a polymer or copolymer of claims 1 or 2 comprising blow molding said polymer.

54. A process for fabricating solid articles from a polymer or copolymer of claims 1 or 2 comprising injection molding said polymer.

55. A process for fabricating solid articles from a polymer or copolymer of claims 1 or 2 comprising extruding said polymer or copolymer.

56. The process of claim 55 used to form a film.

57. The process of claim 55 used to coat electrical wires.

58. A process for preparing fibers from a polymer or copolymer of claims 1 or 2 comprising melt spinning said polymer.

59. A process for fabricating free-standing film from a polymer or copolymer of claims 1 or 2 by dissolving said polymer in a solvent, coating the resulting solution on a substrate, removing the solvent by evaporation, and removing the resulting film from the substrate.

60. A process for coating solid articles with a polymer or copolymer of claims 1 or 2 by coating the surface of an article with a solution of said polymer and removing the solvent by evaporation.

61. A process for preparing composite structures from a polymer or copolymer of claims 1 or 2 comprising powder-coating fibers with said polymer and heating the coated fibers above the glass transition temperature of the polymer or copolymer.

62. A process for preparing composite structures from a polymer or copolymer of claims 1 or 2 by solution-coating fibers with the polymer, removing the solvent by evaporation, and heating the coated fibers above the glass transition temperature of the polymer.

63. The processes of claims 61 or 62 where the fibers are independently selected from the group consisting of rayon, acrylic, pitch, aramids, polybenzimidazole, polybenzoxazole, polyphenylene sulfide, melamine, fluoropolymers, high-density polyethylene, glass, and carbon.

64. An electromechanical actuating device employing a polymer or copolymer of claims 1 or 2.

65. The device of claim 64 wherein the electromechanical actuating element functions as an artificial muscle.

66. The electromechanical actuating device of claim 64 wherein the device is used in catheters, cannulae, guidewires, endoscopes, or similar medical devices.

67. The device of claim 66 wherein the electromechanical actuating device is used to improve the maneuverability of the device.

68. The devices of claim 66 in which the polymer or copolymer is encapsulated with a flexible coating.

69. The device of claim 66 where said flexible coating provides biocompatibility with biological materials in which the sensing element is placed.

70. A sensing device employing the polymers or copolymers of claims 1 or 2.

71. An article employing either one or more polymers or copolymers of claims 1 or 2 in applications requiring use temperature up to 200° C.

72. An article employing one or more polymers or copolymers of claims 1 or 2 in applications requiring use temperature up to 250° C.

73. An article employing one or more polymers or copolymers of claims 1 or 2 in applications requiring use temperature up to 300° C.

74. A device employing electrical wiring that is coated with one or more compositions of claims 1 or 2.

75. A device employing the polymer or copolymer compositions of claims 1 or 2 as dielectric materials.

76. The device of claim 74 wherein the polymer or copolymer composition serves as a printed wiring board.

77. A device employing the polymer or copolymer compositions of claims 10 or 11 as adhesive materials in electronic applications.

78. A device employing a fiber-reinforced composite structure prepared in whole or in part from the polymers or copolymers of claims 23 or 24.

79. A free-standing film comprising one or more of the polymers or copolymers of claims 1 or 2.

80. A coating comprising one or more of the polymers or copolymers of claims 1 or 2.

81. A fiber comprising one or more of the polymers or copolymers of claims 1 or 2.

82. A foam comprising one or more of the polymers or copolymers of claims 1 or 2.

83. A non-woven fibrous mat comprising one or more of the polymers or copolymers of claims 1 or 2.

84. A molded article comprising one or more of the polymers or copolymers of claims 1 or 2.

85. A semi-permeable membrane comprising one or more of the polymers or copolymers of claims 1 or 2.

86. An ion exchange membrane comprising one or more of the polymers or copolymers of claim 22.

87. A membrane electrode assembly comprising one or more of the polymers or copolymers of claim 22.

88. A fuel cell device employing a polymers or copolymers of claims 86 or 87.

89. A photoluminescent or electroluminescent device comprising one or more of the polymers or copolymers of claims 1 or 2.

90. The device of claim 89 wherein the said polymer or copolymer functions as the luminescent component.

91. A device employing electrically conductive materials derived from the polymers or copolymers of claims 1 or 2.

* * * * *